(12) United States Patent
Giovannini et al.

(10) Patent No.: US 6,263,863 B1
(45) Date of Patent: Jul. 24, 2001

(54) COUPLING SYSTEM BETWEEN ENGINE HEAD, INJECTOR AND FUEL MANIFOLD

(75) Inventors: Flavio Giovannini, Casalecchio di Reno; Mirco Lambertini, Ferrara; Luca Tassinari, Forli', all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/340,802

(22) Filed: Jun. 28, 1999

(30) Foreign Application Priority Data

Jul. 1, 1998 (IT) .............................................. BO98A0403

(51) Int. Cl.[7] ................................................... F02M 55/00
(52) U.S. Cl. ............................................................... 123/470
(58) Field of Search ..................................... 123/470, 468, 123/469, 472, 456

(56) References Cited

U.S. PATENT DOCUMENTS 3,412,718 * 11/1968 Long ........................................ 123/468
4,519,371 * 5/1985 Nagase et al. ......................... 123/470
4,944,262 * 7/1990 Molina et al. ......................... 123/470
5,682,859 * 11/1997 Wakeman ............................. 123/470

FOREIGN PATENT DOCUMENTS

| 2208646 | 8/1973 | (DE) . |
| 19735665 | 1/1999 | (DE) . |
| 0878622 | 11/1998 | (EP) . |
| 2012144 | 3/1970 | (FR) . |
| 448089 | 7/1936 | (GB) . |
| 9931381 | 6/1999 | (WO) . |

* cited by examiner

*Primary Examiner*—Thomas N. Moulis
(74) *Attorney, Agent, or Firm*—Baker & Daniels

(57) ABSTRACT

Coupling system between engine head, injector and fuel manifold in which the head has a seating designed to house the said injector, whilst the fuel manifold extends above the head, and is connected to the injector through a bush projecting from the fuel manifold; the injector being coupled to the said seating by means of a ball coupling; the fuel manifold being rigidly secured to the head of the engine, and an opposing spring being interposed between the fuel manifold and the said injector to compress the injector inside the seat.

9 Claims, 2 Drawing Sheets

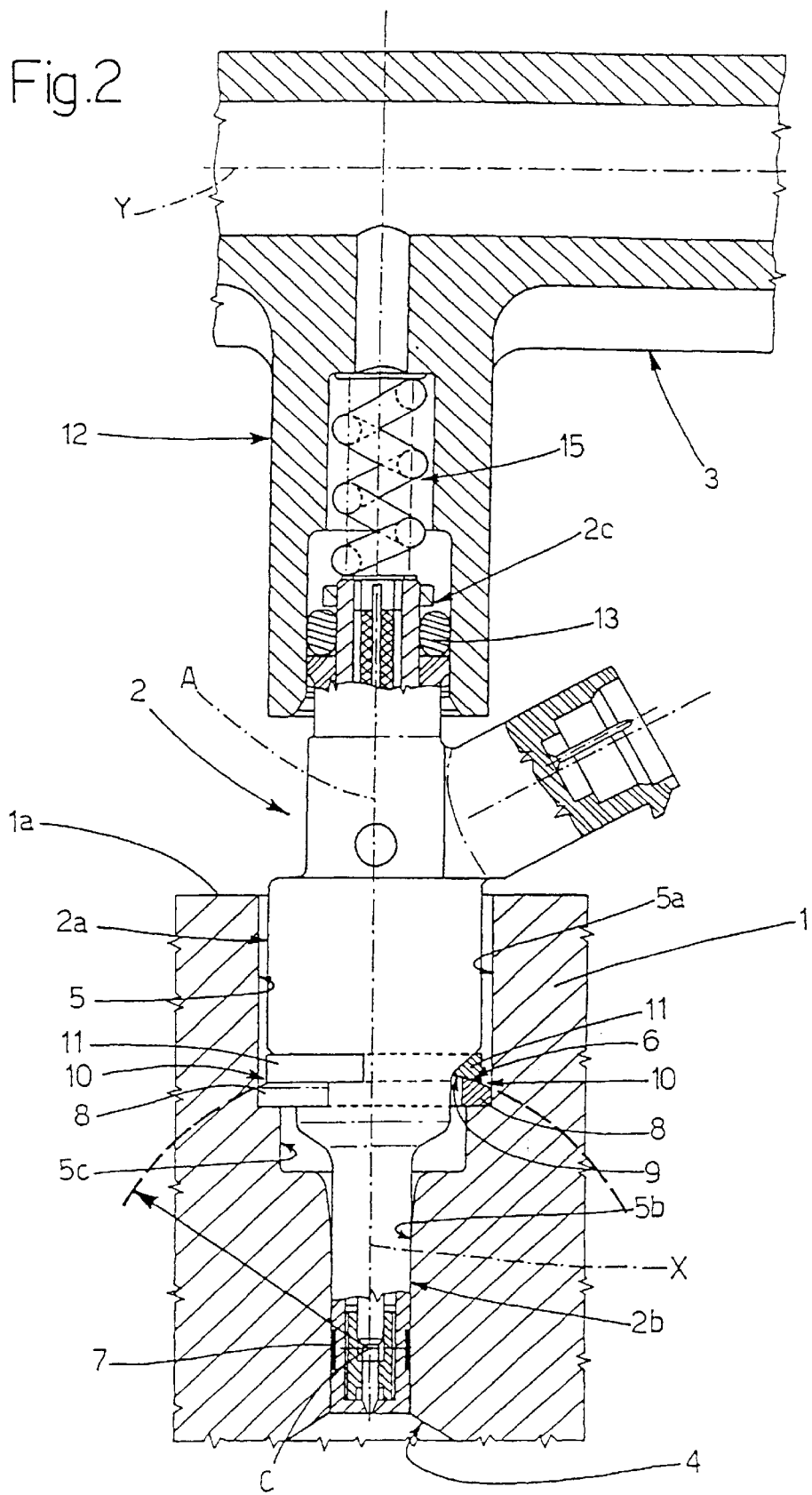

ary example the annular shoulder 9 is achieved by means of a keyed bush 11, coaxial with axis A, on the outside of the central body 2a of the injector 2. Obviously in this case also, the annular shoulder 9 can be achieved directly on the outer lateral surface of the central body 2a of the injector 2.

COUPLING SYSTEM BETWEEN ENGINE HEAD, INJECTOR AND FUEL MANIFOLD

The present invention concerns a coupling system between the engine head, the injector and the fuel manifold.

BACKGROUND OF THE INVENTION

As it is well known, on internal combustion engines at present available in commerce the fuel supply to the combustion chamber is increasingly more frequently achieved by means of one or several injectors housed inside suitable seats recessed into the engine head. Such injectors receive the fuel under high pressure from a fuel manifold which extends above the actual injectors.

The focal point of fuel supply groups described above is the connection between the injector and the fuel manifold which has to be achieved in such a manner as to exclude whatsoever fuel leakage. Such a connection nevertheless calls for design details which by frequently causing misalignment between the injector which projects from the recessed seating in the engine head and the fuel manifold located above the head, involves constraints by interposing between the injector and the fuel manifold a connection seal able to prevent any misalignment.

FIG. 1 illustrates a known coupling system between the engine head, the injector and the fuel manifold, in which the injector 100 is locked inside the seating 101 recessed in the head 102 by means of a securing strap 103 bolted into the head 102. The upper end of the injector 100 is connected to the fuel manifold 104 by means of a rigid bush 105 which has a first end placed on the injector 100 and a second end inserted into the inside of a corresponding seat 106 formed in the actual fuel manifold 104. The rigid bush 105 is coupled to the injector 100 and to the fuel manifold 104 with a certain clearance in such a manner as to make good the eventual unseating, and is held secured to the fuel manifold 104 by means of a flexible locking component 107 located on the outside of the rigid bush 105. The seal is ensured by means of two annular packings positioned to coincide with the two ends of the rigid bush 105.

It is manifest that a connection between injector and fuel manifold such as is shown in FIG. 1 is extremely costly, greatly complicates the assembly of the fuel supply group on the engine, and finally doubles the number of possible fuel leakage points.

SUMMARY OF THE INVENTION

The purpose of the present invention is therefore to achieve a coupling system of an economical nature and basically more secure between the injector and the fuel manifold.

According to the present invention a coupling system is achieved between the engine head, the injector and the fuel manifold in which the engine head has a seat able to accommodate the said injector; the system being characterised by the fact that the injector is coupled with the seat by way of a ball-coupling which allows orientation as required by the injector inside the said seat.

BRIEF DESCRIPTION OF THE DRAWINGS

The present invention is now described with reference to the appended drawings 2 and 3, which illustrate a non-restrictive operating example, in which:

FIG. 2 illustrates with parts in section and parts removed for greater clarity, a coupling system between the engine head, the injector and the fuel manifold achieved according to the details of the invention;

DETAILED DESCRIPTION OF THE INVENTION

Figure 3:
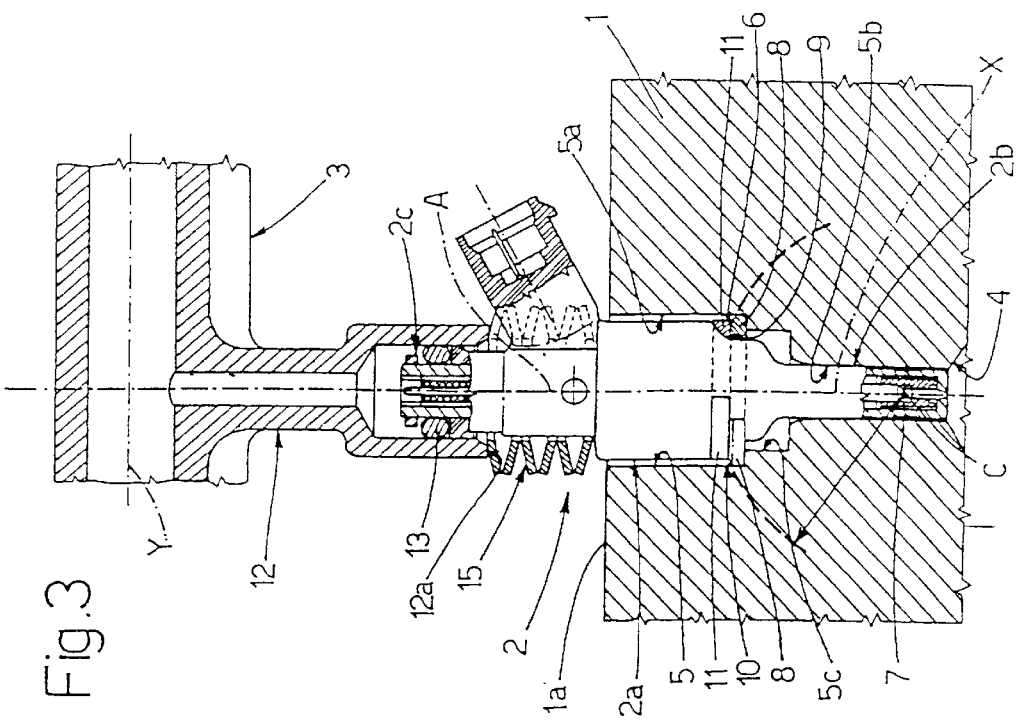
FIG. 3 is a variation in the coupling system between the engine head, the injector and the fuel manifold illustrated in FIG. 2.
Figure 1:
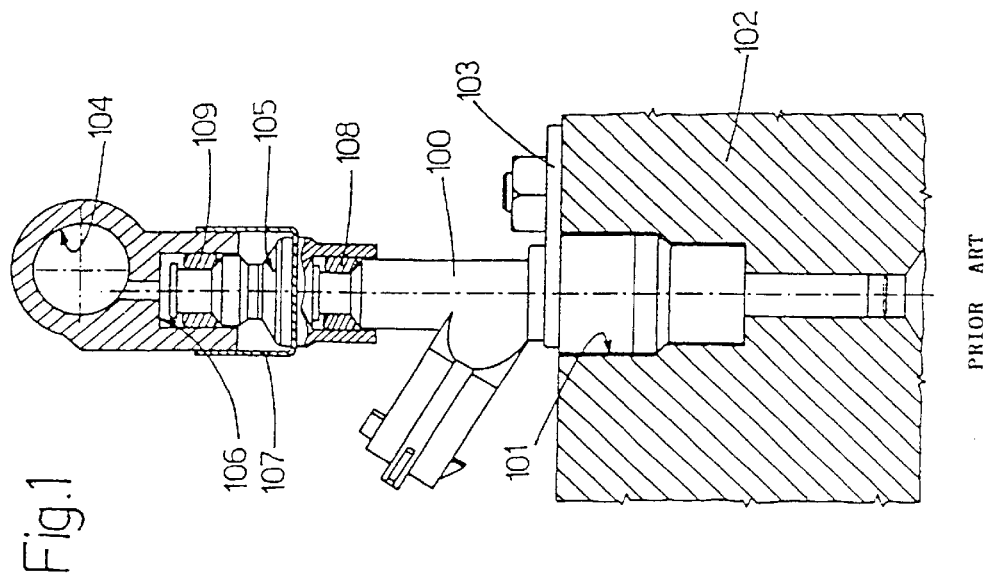
FIG. 1 is a prior art device

With regard to reference numbers 1, 2 and 3 respectively indicating the head of an internal combustion engine, the injector able to provide on demand a specific quantity of fuel inside the combustion chamber of the internal combustion engine, and the fuel manifold inside which the fuel is accumulated under high pressure to be directed towards the combustion chamber of the internal combustion engine.

The head 1, the injector 2 and the fuel manifold 3 are interconnected in such a manner that the fuel under high pressure entering the fuel manifold 3 is able to enter the combustion chamber of the engine which in the example shown here, is partly arranged inside the head 1, and hereinafter appears under reference 4. To house the injector 2, the head 1 of the internal combustion engine has a seat 5 communicating with the combustion chamber 4 of the internal combustion engine. The said seat 5 extends in the head 1 coaxially with axis X perpendicular with the example shown for the outer surface of the head 1, and has an upper portion 5a of mainly cylindrical form, able to be engaged by the central body 2a of the injector 2; a lower portion 5b of essentially truncated cone form, communicating with the combustion chamber 4 and able to be engaged by the end portion 2b of the injector 2 in which is recessed the spray nozzle; and finally an intermediate portion 5c connecting the portions 5a and 5b one with the other. With regard to FIG. 2, the upper portion 5a and the intermediate portion 5c are separated from each other by an annular shoulder 6 coaxial with axis X, having the form of a spherical crown with a recess turned towards the lower portion 5b, or towards the inside of the head 1. The inside of the spherical surface belonging to the spherical crown defined by the annular shoulder 6 is located along axis X, coinciding with the centre of the annular seat 7 resented by the injector 2 on the outer surface of the end portion 2b, immediately pstream of the spray nozzle.

In the example illustrated here, in particular, the annular shoulder 6 is formed complete with an inserted bush 8 coaxial with axis X, inside the upper portion 5a of the seat 5. Obviously it is also possible to achieve an annular shoulder 6 directly on the side wall of the seat 5.

The injector in turn is provided with an annular shoulder 9 extending coaxially with axis A of the injector 2, on the outside of the central body 2a of the injector 2. The said annular shoulder 9 provides a shape additional to the annular shoulder 6 in such a manner as to be located so as to bear thereupon it, the latter defining a spherical coupling 10.

Similarly to the annular shoulder 6, in the illustrated example the annular shoulder 9 is achieved by means of a keyed bush 11, coaxial with axis A, on the outside of the central body 2a of the injector 2. Obviously in this case also, the annular shoulder 9 can be achieved directly on the outer lateral surface of the central body 2a of the injector 2.

As the central body 2a of the injector 2 engages in the upper portion of the seat 5 with a given clearance, and the lower portion 5 has a truncated cone differing from the intermediate portion 5c, the spherical coupling existing between the injector 2 and the seat 5 allows a variation at will of the position of the injector 2 on the inside of the seat 5. In particular the ball coupling 10 allows the injector 2 to be inclined in one way or the other inside the seat 5, in such a way that the axis A of the injector 2 is inclined by a specific angle defined in relation to axis X of the seat 5. With reference to FIG. 2, the fuel manifold 3 extends above the head 1 coaxially with an axis Y, preferably though not necessarily, parallel with the outer surface 1a of the head 1, and rigidly secured to the head 1 of the engine by means of securing components not illustrated here, and has a connecting bush 12 which extends towards the injector 2 located in the seat 5 of the head 1. The said bush 12 is designed to admit internally a part of the end portion 2c of the injector 2 which projects externally from the seat 5.

In the event of design tolerance requirements, if the bush 12 is not perfectly aligned with the seat 5, or should it fail to be coaxial with axis X, the presence of the ball coupling 10 between the injector 2 and seat 5 allows the orientation of the injector 2 in such a manner that the end portion 2c may be introduced into the bush 12.

Also in the event that the injector 2 fails to be perfectly aligned with the bush 12, an annular seal 13 located on the end portion 2c of the injector 2 prevents fuel from escaping under high pressure.

Locking means 15 are finally provided to retain the injector 2 inside the seat 5 with the annular shoulder 9 bearing against the annular shoulder 6 in such a manner as to achieve the ball coupling 10.

In the example illustrated here, such locking means 15 consist of a compressed retaining spring, which is located between the injector 2 and the fuel manifold 3 in such a manner as to squeeze the injector 2 inside the seat 5. In FIG. 2 the said retaining spring is housed inside the bush 12 in such a manner as to have a first end bearing against the end portion 2c of the injector 2, and a second end bearing against the bottom of the bush 12.

In the variation illustrated in FIG. 3, the retaining spring is a rated spring perfectly fitting the injector 2 in such a way as to present a first end bearing against the central body 2a of the injector 2, and a second end bearing against the peripheral edge 12a of the bush 11. Obviously the rated spring is without centre rib so as not to interfere with the pin of the injector 2.

The operation of the coupling system between the engine head 1, the injector 2 and the fuel manifold 3, is easily inferred from the above description, and consequently does not require further explanations. It is obvious that the aforementioned coupling system, having eliminated a number of initially essential components, has greatly reduced costs and assembly time. The said system also has the further advantage of having reduced to the minimum essentials the number of connections by means of which fuel under high pressure may escape.

Finally it is clear that the coupling system between the engine head 1, the injector 2 and the fuel manifold 3 described and illustrated here will allow modifications and variations yet without departing from the scope of the present invention.

What is claimed is:

1. Coupling system between the engine head (1), the injector (2) and the fuel manifold (3) in which the head (1) of the engine has a seat (5) able to house the said injector (2); the system being characterised by the fact that the injector (2) is coupled with the seat (5) by means of a ball-coupling (10) which allows the orientation on demand of the injector (2) inside the said seat (5).

2. Coupling system according to claim 1, characterised by the fact that the said seat (5) has within it a first annular shoulder (6) essentially in the form of a spherical crown, and that the said injector (2) presents externally a second annular shoulder (9) essentially in the form of a spherical crown, complementary to the said first annular shoulder (6); the said second annular shoulder (9) being designed to bear against the said first annular shoulder (6) to define the said ball-coupling (10).

3. Coupling system according to claim 2, characterised by the fact that the said seat (5) is internally provided with a first bush (8) which defines the said first annular shoulder (6).

4. Coupling system according to claim 2, characterised by the fact that the said injector (2) is fitted externally with a second bush (11) keyed to the body (2a) of the said injector (29); the said second bush (11) defining the said annular shoulder (6).

5. Coupling system according to claim 2, characterised by the fact that the spherical crown defined by the said first annular shoulder (6) is located with the hollow turned towards the inside of the said head (1).

6. Coupling system according to claim 5, characterised by the fact that the said seat (5) communicates with the combustion chamber of the engine and extends inside the said head (1) coaxially with a specific axis (X); the said injector (2) being housed inside the said seat (5) with the spray end (2b) turned towards the engine combustion chamber; the said spray end (2b) having externally an annular seal (7), and the centre (c) of the spherical surface of the said first annular shoulder (6) being positioned along the specific axis (X), to coincide with the said annular seal (7).

7. Coupling system according to claim 1, characterised by the fact that it comprises securing means (15) designed to maintain the said injector (2) on the inside of the said seat (5).

8. Coupling system according to claim 7, characterised by the fact that the said fuel manifold (3) extends above the said head (1) and has a bush (12) for the connection to the said injector (2); the said fuel manifold (3) being rigidly connected with the said engine head (1), and the said securing means (15) comprising a flexible component (15) interposed between the said fuel manifold (3) and the said injector (2) to squeeze the said injector (2) inside the said seat (5).

9. Coupling system according to claim 8, characterised by the fact that the said flexible component is housed on the inside of the said bush (12).

* * * * *